US007366914B2

(12) United States Patent
Graunke

(10) Patent No.: US 7,366,914 B2
(45) Date of Patent: Apr. 29, 2008

(54) SOURCE CODE TRANSFORMATION BASED ON PROGRAM OPERATORS

(75) Inventor: Gary L. Graunke, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 774 days.

(21) Appl. No.: 10/652,140

(22) Filed: Aug. 29, 2003

(65) Prior Publication Data

US 2005/0050355 A1 Mar. 3, 2005

(51) Int. Cl.
G06F 9/45 (2006.01)
G06F 9/305 (2006.01)
G06F 9/445 (2006.01)
(52) U.S. Cl. ................................. 713/190; 717/147
(58) Field of Classification Search ............. 713/190; 714/33, 35, 37
See application file for complete search history.

(56) References Cited

U.S. PATENT DOCUMENTS

| 4,642,764 | A | * | 2/1987 | Auslander et al. | 717/153 |
| 5,280,613 | A | * | 1/1994 | Chan et al. | 717/147 |
| 5,339,419 | A | * | 8/1994 | Chan et al. | 717/147 |
| 6,041,122 | A | | 3/2000 | Graunke et al. | 380/21 |
| 6,205,550 | B1 | | 3/2001 | Nardone et al. | 713/200 |
| 6,256,577 | B1 | | 7/2001 | Graunke | 701/117 |
| 6,477,252 | B1 | | 11/2002 | Faber et al. | 380/200 |
| 6,931,634 | B2 | * | 8/2005 | Croix | 717/146 |
| 2004/0115860 | A1 | * | 6/2004 | Johnson et al. | 438/102 |
| 2005/0050355 | A1 | * | 3/2005 | Graunke | 713/201 |

OTHER PUBLICATIONS

U.S. Appl. No. 10/355,967, filed Jan. 31, 2003, Graunke.
Ripley, Michael, et al. "Interoperable Home Infrastructure: Content Protection in the Digital Home". Intel Technology Journal, vol. 6, Issue 04. pp. 49-56 Nov. 15, 2002.
Collberg, Christian S. "Watermarking, Tamper-Proofing, and Obfuscation—Tools for Software Protection". IEEE Transactions on Software Engineering, vol. 28, No. 6. Jun. 2002.
Gaissarian, "Preliminary Report on Optimizing Compilers and Code Transformations". pp. 1-38. Jun. 1, 2000.
Jacobson, "Planning Content Protection for PC DTV". Intel Developer Magazine. pp. 1-6. Nov. 2001.
Intel Corporation, "Intel Renewable Authentication Agent System 1.2 Developer's Guide". pp. 1-47. Apr. 1999.

* cited by examiner

*Primary Examiner*—Gilberto Barron, Jr.
*Assistant Examiner*—Venkat Perungavoor
(74) *Attorney, Agent, or Firm*—Trop, Pruner & Hu, P.C.

(57) ABSTRACT

In one embodiment, the present invention may perform a transformation based on existing program operations or operators which may provide encrypting compiler-generated code for compilation with original source code, securing distributable content in hostile environments. As an example, use of compiler analysis and heuristics for pairing variables and identifying encryption/decryption points may protect distributable software, such as the compiled code from automated attacks. In one embodiment, pre-compiler software may dynamically obtain one or more program operators from the source code for applying data transformation based on custom ciphers to encrypt/decrypt data in between references to data variables in a particular portion of the source code, providing encrypting compiler-generated code for mixing with the source code prior to compilation into tamper-resistant object code.

23 Claims, 7 Drawing Sheets

SOURCE CODE TRANSFORMATION BASED ON PROGRAM OPERATORS

BACKGROUND

The present invention relates generally to security of distributable content in hostile environments, and more particularly to protecting distributable software from hostile attacks, such as automated attacks.

Commercial vendors may distribute sensitive software-based content on physically insecure systems and/or to devices. For example, content distribution for multi-media applications may involve electronic dissemination of books, music, software programs, and video over a network. In particular, software is often distributed over the Internet to servers where access control enforcement cannot be guaranteed, as sites may be beyond the control of the distributor. Nonetheless, such Internet-based software distribution does require management and enforcement of digital rights of the distributed content. However, the distributed content may be prone to different kinds of attacks, including a direct attack by an otherwise legitimate end user and an indirect attack by a remote hacker or an automated attack, employing different software tools. Often inhibiting a hacker from altering or bypassing digital rights management policies for content protection is referred to as copy protection.

To this end, before distribution, software is compiled to hide source-level secrets and programming techniques embedded within the source code. Software compilers compile source code developed in a source language into target code in a target language. The target code may need to be protected from automated programs that may ascertain the data flow in the compiled code using different tools such as static analysis and run-time trace analysis.

Software, being information, is trivially easy to modify. Tamper-resistant software also can be trivially modified, but the distinguishing characteristic is that it is difficult to modify tamper-resistant software in a meaningful way. Often attackers wish to retain the bulk of functionality, such as decrypting protected content, but skip payment or modify digital rights management portions. This implies that in tamper-resistant software it is not easy to observe and analyze the software to discover the point where a particular function is performed, nor how to change the software so that the desired code is changed without disabling the portion whose functionality the attacker wishes to retain.

In order to avoid wholesale replacement of the software, for example, the software must contain and protect a secret. This secret might be simply how to decode information in a complex, unpublished, proprietary encoding, or it might be a cryptographic key for a standard cipher. However, in the latter case, the resulting security is often limited by the ability of the software to protect the integrity of its cryptographic operations and confidentiality of its data values, which is usually much weaker than the cryptographic strength of the cipher. Indeed, many attempts to provide security simply by using cryptography fail because the software is run in a hostile environment that fails to provide a trusted computing base. Such a base is required for cryptography to be secure, and must be established by non-cryptographic means (though cryptography may be used to extend the boundaries of an existing trusted computing base).

Thus, there is a continuing need for better ways to secure distributable content in hostile environments, especially protecting distributable software from analyses that extract embedded secrets and changes that circumvent embedded policies enforced by the software.

DETAILED DESCRIPTION

Figure 1:
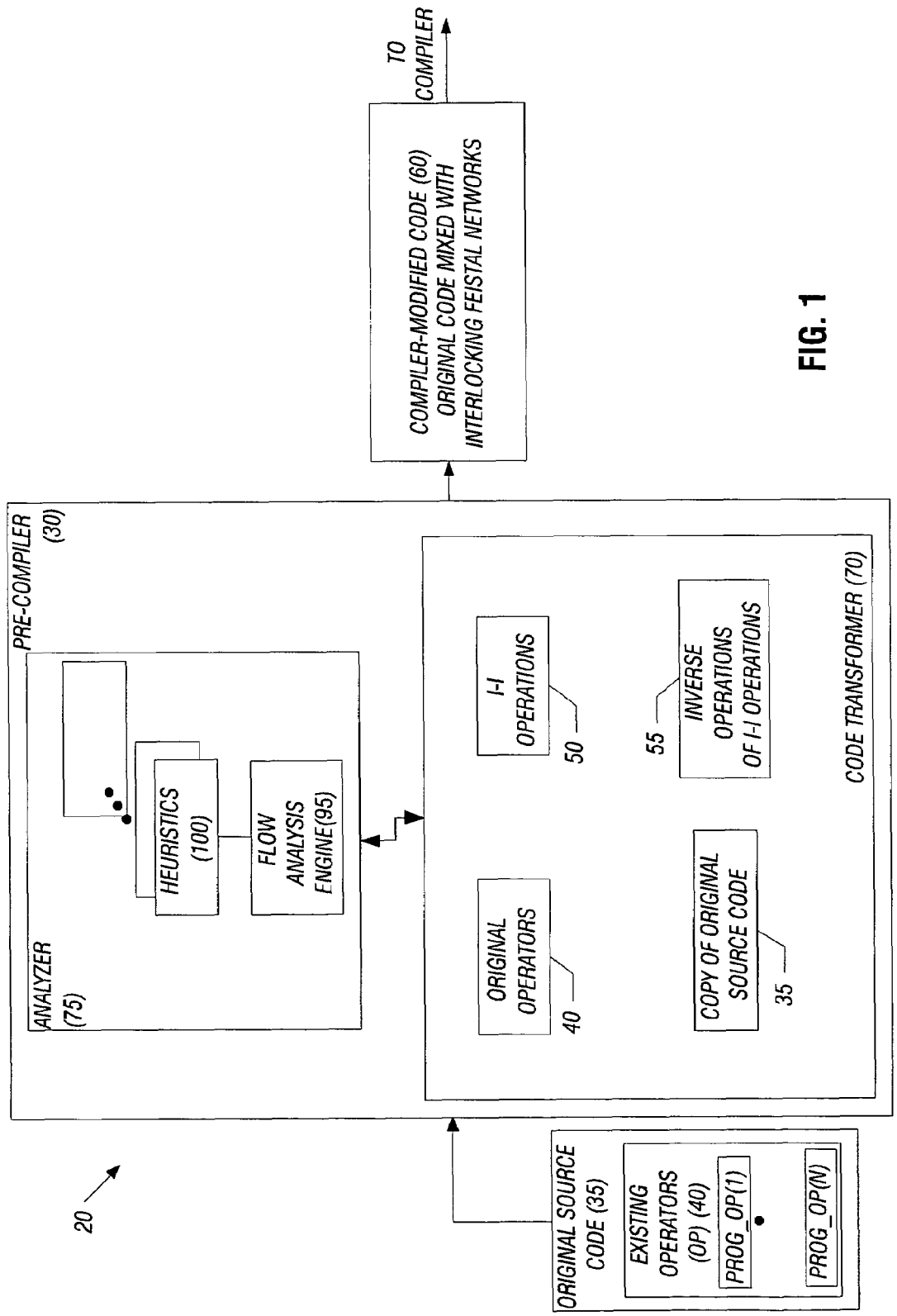
FIG. 1 is a schematic depiction of a program compiler module in accordance with one embodiment of the present invention.

Referring to FIG. 1, shown is a program compiler module ("module") 20 in accordance with one embodiment of the present invention. Module 20 may be used to transform a program written in a high-level programming language into mixed data or code that may include original program code and code the program compiler module 20 generates, making it substantially difficult to analyze, according to one embodiment of the present invention. In various embodiments, the program compiler module 20 may include pre-compiler software 30 which may receive original source code 35 developed for a program as an input. The original source code 35 may include existing program operations or operators 40, for example PROG_OP(1) through PROG_OP (N). Examples of the existing program operations or operators 40 include mathematical operators and other commands to manipulate data variables. Examples of data variables may include data objects of different types, such as integers and characters.

In operation, the pre-compiler software 30 may apply data transformation to a portion of the original source code 35 based on at least one of the existing program operations or operators 40, resulting in compiler-modified code 60 which may include original code mixed with interlocking Feistal networks, in one embodiment. The compiler-modified code 60 may further be fed into a compiler, such as a commercial compiler for compilation, producing object or compiled code, in some embodiments of the present invention. One particular data transformation consistent with various embodiments of the present invention may involve concealing data variables to primarily secure the distributable content, such as the compiler-modified code 60, against hostile attacks. Examples of hostile attacks include hacker and automated attacks that may occur in a variety of hostile environments capable of executing malicious software programs or tools.

Although in the illustrated embodiment the logic to apply the data transformation is incorporated within the pre-compiler software 30, other embodiments may be implemented using different forms of programs and tools that analyze and control the flow of data and/or code, such as software analysis, de-bugging, and testing tools. Furthermore, certain embodiments of the present invention may be implemented in other forms of software development tools.

The type of computer programming languages used to write or develop the pre-compiler software 30 may include both object-oriented languages and procedural languages. As two examples, high-level programming languages including C and C++ may be used to implement the pre-compiler software 30. While some embodiments of the pre-compiler software 30 may be particularly suitable for programs developed in C and/or C++ programming languages, any appropriate source language that may provide source code corresponding to the program may equally be applicable in other embodiments of the present invention.

The pre-compiler software 30 may include a code transformer 70 coupled to an analyzer 75 for applying a desired data transformation to a particular portion of the original source code 35, in accordance with some embodiments of the present invention. In one embodiment, code transformer 70 may include a copy of the original source code 35, along with original operations or operators 40 therein. From this code, 1 to 1 (1-1) operations 50 found in the code may be identified, and chosen as decryptographic operators. Similarly, inverse operations 55 of 1-1 operations 50 may be identified and chosen as decryptographic operators. Collectively, operations or operators 50 and 55 may be termed "transformer-generated operators" or "compiler-generated operators". Instead of using a fixed one or more program operations or operators, both transformer-generated operations or operators 50 and 55 and the existing operations or operators 40 may be dynamically obtained. That is, a cryptographic operator, its inverse, and an associated function may be randomly chosen to govern a random selection process for both the transformer-generated operations or operators 50 and 55 and the existing operations or operators 40. As an example, a random Feistal operator and its inverse may be selected in conjunction with a round function for some embodiments.

Based on the existing program operations or operators 40 and/or transformer-generated operations or operators 50 and 55, code transformer 70 may form a particular custom cipher for a single use in encryption/decryption. When used for encryption, the custom cipher based on either the transformer-generated operators 50 and 55 and/or the existing program operator 40, may result in compiler-modified code 60 that offers tamper resistance upon compilation by a compiler (not shown). In one specific example, using existing program operations or operators 40 as the custom ciphers, data in between references to certain data variables in the program may be encrypted and decrypted, making construction of automated attack or analysis programs, tools or traces that ascertain the data flow in the object or compiled code difficult. Some of the automated attacks or analysis programs may use both static analysis and run-time traces to analyze data flow in the object or the compiled code.

To analyze the data flow in the original source code 35 to encrypt and decrypt data, the analyzer 75 may include a flow analysis engine 95 and one or more heuristics 100 according to multiple embodiments of the present invention. Using the flow analysis engine 95, in some situations, the pre-compiler software 30 may identify the regions of the original source code 35 where data variable(s) is(are) not used. Based on a heuristic (i.e., at least one of the heuristics 100), two successive references to each variable of a variable pair may be located in the original source code 35. Data in between the two references to each variable of the variable pair may be appropriately encrypted and decrypted, involving an encryption and a decryption transformation for some embodiments.

In the encryption transformation, for example, data values may be associated with each variable of the variable pair, while the decryption transformation may result in decryption of the same data, in many situations. Additionally, matching pairs of the data values for each variable of the variable pair may be iteratively formed through the flow analysis engine 95 via the heuristics 100. For scrambling data, cryptographic networks, such as interlocking Feistal networks, may be created in each iteration involving a different matching pair of the data values in some cases. The interlocking Feistal networks may generate blocks of keys from blocks of the original source code 35, through multiple rounds of groups of permutations and substitutions such that each iteration may be dependent upon data transformations of a key based on a different matching pair of data values.

Figure 2:
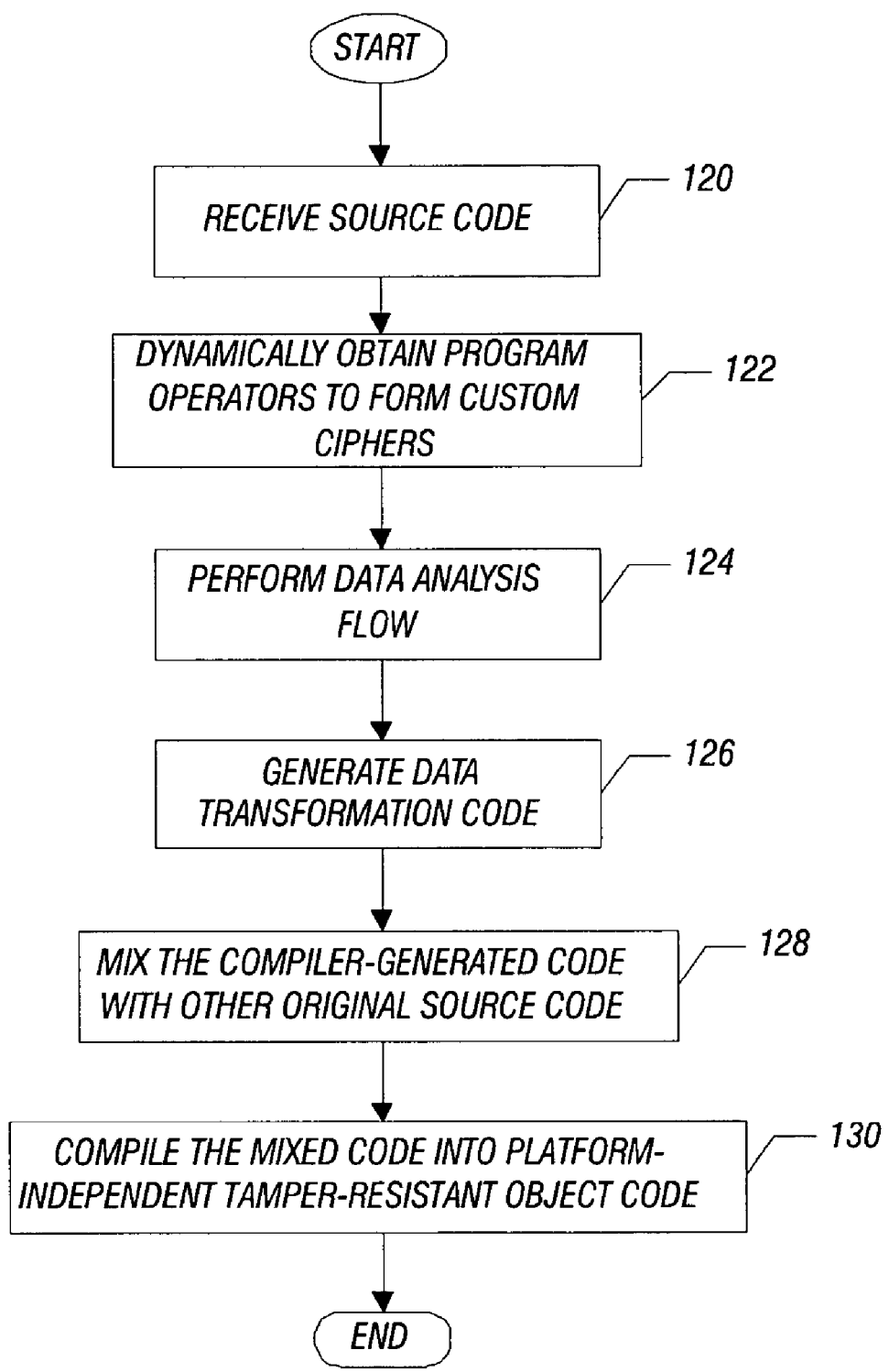
FIG. 2 is a flow diagram for mixing data before compilation thereof into object code by the program compiler module shown in FIG. 1 according to one embodiment of the present invention.

Referring to FIG. 2, shown is a flow diagram of a data mixing method in accordance with one embodiment of the present invention. As shown in FIG. 2, the pre-compiler software 30 may receive the original source code 35 from which the existing program operations or operators 40 may be obtained to form the custom ciphers, as shown in blocks 120 and 122. To determine matching references to a pair of variables within the original source code 35, a data flow analysis may be performed at block 124. At block 126, data transformation code may be generated such that after a subsequent recompilation, data transformation may be applied. As an example, data transformation code at block 126 may involve the creation of Feistal networks for later data encryption and/or decryption.

Next, the compiler-generated code and other original source code may be mixed at block 128, enhancing code obfuscation between the original source code 35 and the encrypting compiler-generated code. At block 130, the mixed code may then be compiled by a compiler, such as any suitable commercial compiler, into platform-independent, tamper-resistant object or compiled code, according to many examples of the present invention.

As such, the encrypting compiler-generated code may be combined with the original source code 35 in such a way that use of both static analysis tools and execution trace analysis tools that determine data flow in the program may become significantly difficult. That is, inability to determine where a stored data value was used and where a loaded data value was defined in a data flow analysis may offer robustness to content security, providing significantly improved copy and/or content protection for the original source code 35.

Figure 3A:
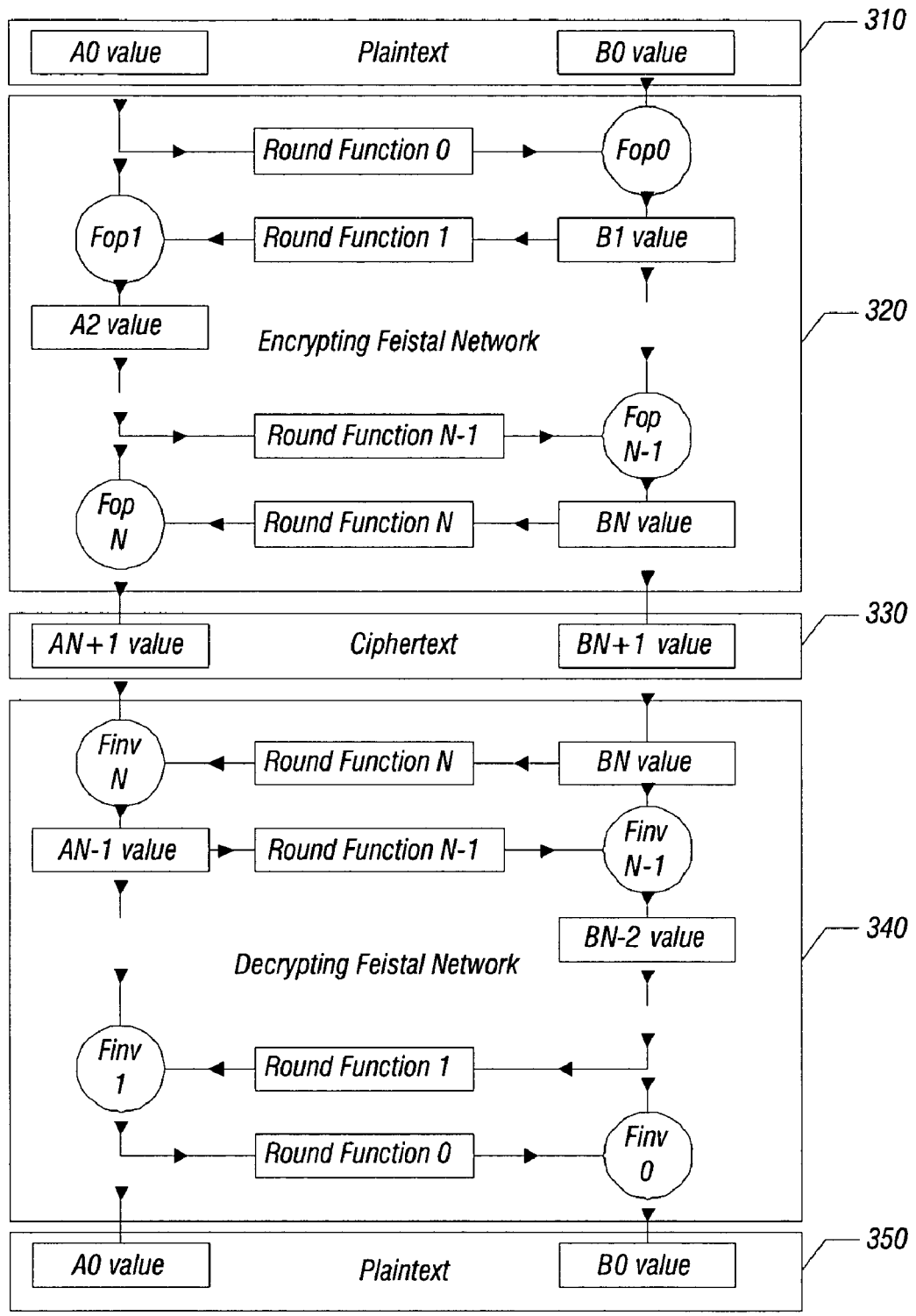
FIG. 3A is a block diagram of a Feistal network for use in accordance with one embodiment of the present invention.

Referring now to FIG. 3A, shown is a block diagram of a Feistal network for two data values. As shown in FIG. 3A, module 310 includes an A0 value and a B0 value. These values are applied to an encrypting Feistal network 320, in which the values are encrypted using a plurality of round functions. The resulting output of encrypting Feistal network 320 is a cipher text module 330, which includes a $A_{n+1}$ value and a $B_{n+1}$ value. These values may then be applied to a decrypting Feistal network 340, which includes inverse round functions to decrypt cipher text module 330 into plain text module 350, which again contains an A0 value and a B0 value.

In such an embodiment, each step where a function is applied to a source value and, usually together with key material, combined with another target value using a 1-to-1 operation (e.g., $F_{op}0$), replacing the target value, is called a round. The function is the round function. Decryption applies the rounds in the reverse order of encryption. Both encryption and decryption may use the same round function for each round. In certain embodiments, encryption may use a 1-1 operator to combine the function with the target value, and decryption uses its inverse. The round functions and invertible combining operators may be different for each round, in certain embodiments.

In various embodiments, a large number of interlocking Feistal networks may be generated, where the pairing of variables is different for each round, and the pairs are drawn from all available variables of the same size. Since the software may be easily inspected, key material may not be added in each round. Rather, a goal of certain embodiments may be to prevent simple inspection of variables, and to ensure that unwanted changes to variables will usually have many unintended side effects.

In common cryptography, the entropy is in the key material, while the cipher is assumed to be known. In obfuscation, the key material, if any, may be embedded throughout the code, and the unique, unknown cipher contains all the entropy. Thus, the aim is not so much to encrypt the data as to obscure the data flow in the program such that automated analysis is difficult.

In certain embodiments, original source code 35 may be scanned for suitable round functions. In certain embodiments, these functions may have an input and output size corresponding to variables in the program. In addition, 1-to-1 operators 50 found in the program may be noted for use as Feistal combining operators for encryption. The corresponding inverse operators 55 to the 1-to-1 operators may also noted, and may be used for decryption rounds corresponding to encryption rounds using the 1-to-1 operators. In alternate embodiments, the inverse operators 55 may be used to construct an encryption round and the original 1-to-1 operators 50 used for the corresponding decryption round.

In various embodiments, code transformer 70 may select different variables and randomly select round functions and combining operators and their inverses to construct interlocking Feistal networks. In such manner, these networks encrypt variables and add artificial data flows and interdependencies to the program, obscuring the original data flows when the code is analyzed, either statically or dynamically (run-time trace). Also, during program execution, if a variable is modified at an unexpected time according to the original source code 35, the Feistal networks may induce massive side effects in other variables, resulting in an obvious malfunction of the code.

Figure 3B:
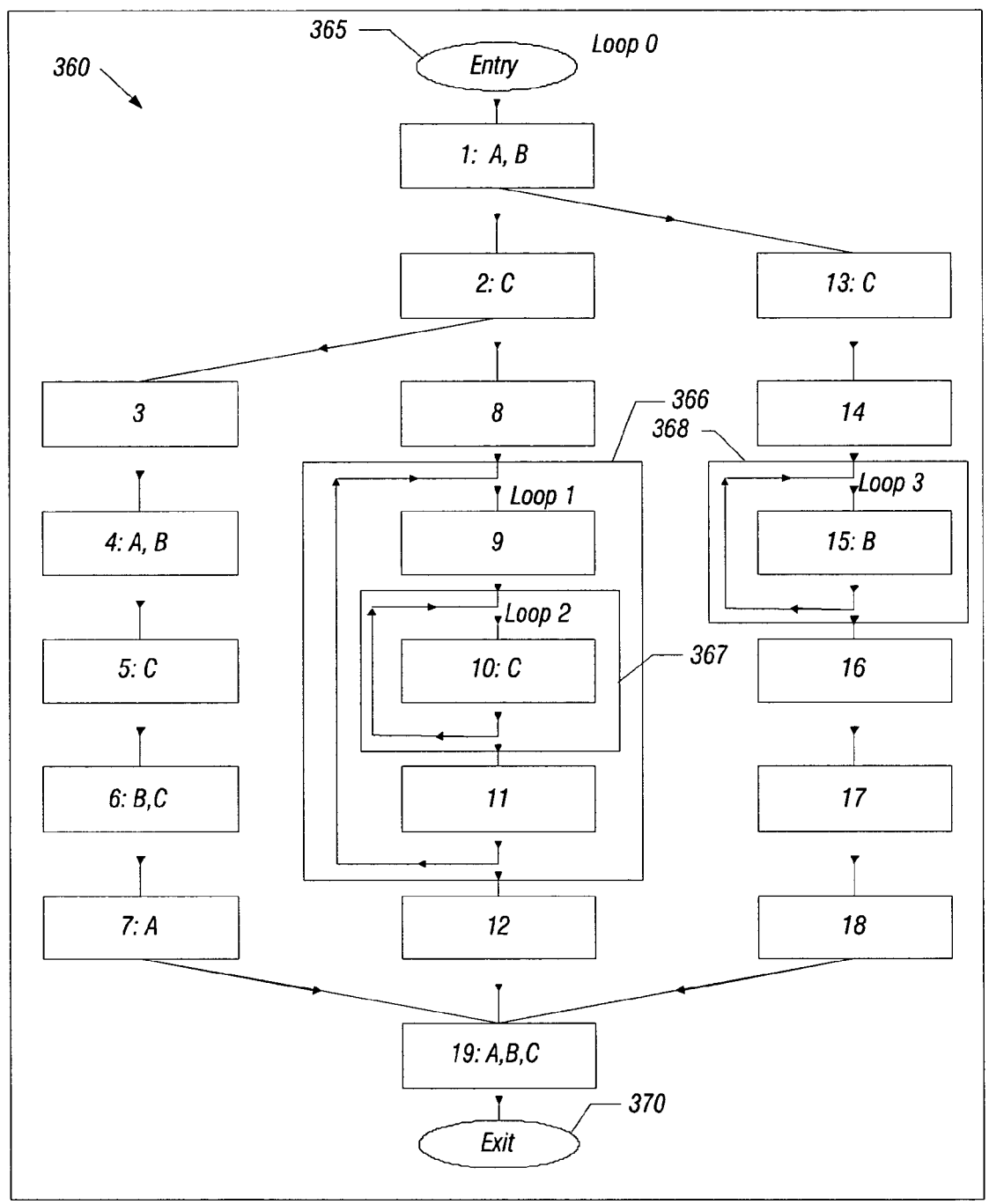
FIG. 3B is a control flow graph of a program in accordance with one embodiment of the present invention.

Referring now to FIG. 3B, shown is a control flow graph of a program 360. As shown in FIG. 3B, program 360 includes an entry point (oval 365) and a plurality of blocks 1-19. Each block is a single-entry, single-exit section of code. The arcs show possible flows of control between blocks. Each block is numbered for reference in reverse depth-first order, as is common in compiler dataflow analysis algorithms. Also shown in FIG. 3B is an exit point (oval 370), along with a first loop 366, a second loop 367, and a third loop 368 in the code.

As shown in FIG. 3B, the blocks are partitioned into loops. In addition to the three actual loops (i.e., 366, 367, and 368), the entire program may be treated as a loop (i.e., Loop 0) for purposes of a data transformation. As shown in FIG. 3B, second loop 367 is nested inside first loop 366, and has a nesting depth of 2. First loop 366 and third loop 368 are directly nested inside of Loop 0, at a nesting depth of 1.

While FIG. 3B shows only three variables, A, B, and C, in the program 360 for purposes of illustration, it is to be understood that more variables may typically be present in a program of this size. As shown in FIG. 3B, some of blocks 1-19 include references to certain of the variables. For example, block 1 includes references to both variables A and B, while block 2 shows a reference to variable C, and so forth. There is no need to distinguish between uses and (value) definitions of the variable references.

In accordance with one embodiment of the present invention, for each block, the distance (in terms of blocks) from the nearest reference for each variable may be computed. Alternately, any other distance measures may be used, such as operation counts. In the following discussion, a particular variable may be assumed to be fixed, though the computation is performed for each variable.

First, for each variable present in the flow control graph, begin by assigning blocks a zero if it contains one or more references to the variable. Otherwise, a large number (approximating infinity) may be assigned, in one embodiment.

Next the distance between references to the variable may be computed. To compute the distance between blocks, one can repeatedly traverse blocks in alternating orders (e.g., forward with the program flow, then backward against the program flow) until a forward and a backward pass result in no changes. In one embodiment, the rules for updating the distance as a function of the preceding or following blocks may be as follows:

If the minimum of the preceding (or following) block value's V is less than the block being updated (U) current value $D_U$, the value $D_U$ is updated to the minimum element of the preceding (or following) block value's set V. The set V of preceding (following) block values may be defined as follows, in one embodiment:

0) if block P has no predecessors (successors), the value 0 is in the set of V.
1) If block P, an immediate predecessor (or successor) to U, is in the same loops as the block being updated, the distance ($D_P$+1) is in the set V.
2) Otherwise if U is in a loop that P is not, the value 0 is in the set V.
3) Otherwise if P is not in the same loops as U, and the loops not in common with U of P contain one or more references to the variable, the value 0 is in the set V.
4) Otherwise if P is not in the same loops as U, and the loops not in common with U of P contain no references to the variable, values to V may be added for all predecessors of the entries (successors of exits) of the outmost loop of P not in common with U. (These will be in the same loop as U—case 1).

Referring to Table 1 below, shown are a pass through the control flow graph of program 360 shown in FIG. 3B in accordance with the above rules, for variable A. As shown in Table 1, variable A is provided with an initial value for each of the nineteen blocks of program 360 (Variable A Initial value). In the next column (Pass 1F Value), calculated values for a first pass are shown. In the next column (Pass 1F Notes), information regarding the first pass is shown. Specifically, the first value in the parenthesis indicates the previous block from which control passes; the second value provides the rule (as numbered above); and the third value is the value obtained by applying the given rule.

Table 1 also includes values for a first backwards pass through the control flow graph of program 360 shown in FIG. 3B and notes therefor (Pass 1B Value and Pass 1B Notes), respectively. Finally, Table 1 includes a second forward pass through the flow control graph of program 360 shown in FIG. 3B (Pass 2F Value and Pass 2F Notes). Tables 2 and 3 following Table 1 include the same information for variables B and C, respectively.

Thus, the Table 1 (and Tables 2 and 3 following Table 1) notes are of the form (x, y, z), and act as an abbreviation for "For block x, rule y was applied to derive a value z." An asterisk for x means that there are no preceding/succeeding blocks (this implies rule 0). An asterisk for z means that no value is produced directly—e.g., rule 4 only brings more blocks into play, which then produce values. All the z values may be compared with the previous value for the block (row) distance for which a distance is being computed, and the minimum of the previous value and the (one or more) z value is taken.

TABLE 1

| Block No. | Variable A Initial Value | Pass 1F Value | Pass 1F Notes | Pass 1B Value | Pass 1B Notes | Pass 2F Value | Pass 2F Notes |
|---|---|---|---|---|---|---|---|
| 1  | 0    | 0 | (*, 0, 0)              | 0 | (2, 1, 2), (13, 1, 2)   | 0 | (*, 0, 0) |
| 2  | 9999 | 1 | (1, 1, 1)              | 1 | (3, 1, 2), (8, 1, 3)    | 1 | (1, 1, 1) |
| 3  | 9999 | 2 | (2, 1, 2)              | 1 | (4, 1, 1)               | 1 | (2, 1, 2) |
| 4  | 0    | 0 | (3, 1, 3)              | 0 | (5, 1, 2)               | 0 | (3, 1, 2) |
| 5  | 9999 | 1 | (4, 1, 1)              | 1 | (6, 1, 2)               | 1 | (4, 1, 1) |
| 6  | 9999 | 2 | (5, 1, 2)              | 1 | (7, 1, 1)               | 1 | (5, 1, 2) |
| 7  | 0    | 0 | (6, 1, 3)              | 0 | (19, 1, 1)              | 0 | (6, 1, 2) |
| 8  | 9999 | 2 | (2, 1, 2)              | 2 | (9, 4, *), (12, 1, 2)   | 2 | (2, 1, 2) |
| 9  | 9999 | 0 | (8, 2, 0)              | 0 | (10, 4, *), (11, 1, 2)  | 0 | (8, 2, 0) |
| 10 | 9999 | 0 | (9, 2, 0)              | 0 | (11, 2, 0)              | 0 | (9, 2, 0) |
| 11 | 9999 | 1 | (10, 4, *), (9, 1, 1)  | 0 | (12, 2, 0)              | 0 | (10, 4, *), (9, 1, 1) |
| 12 | 9999 | 3 | (11, 4, *), (8, 1, 3)  | 1 | (19, 1, 1)              | 1 | (11, 4, *), (8, 1, 3) |
| 13 | 9999 | 1 | (1, 1, 1)              | 1 | (14, 1, 3)              | 1 | (1, 1, 1) |
| 14 | 9999 | 2 | (13, 1, 2)             | 2 | (15, 4, *), (16, 1, 4)  | 2 | (13, 1, 2) |
| 15 | 9999 | 0 | (14, 2, 0)             | 0 | (16, 2, 0)              | 0 | (14, 2, 0) |
| 16 | 9999 | 3 | (15, 4, *), (14, 1, 3) | 3 | (17, 1, 3)              | 3 | (15, 4, *), (14, 1, 3) |
| 17 | 9999 | 4 | (16, 1, 4)             | 2 | (18, 1, 2)              | 2 | (16, 1, 4) |
| 18 | 9999 | 5 | (17, 1, 5)             | 1 | (19, 1, 1)              | 1 | (17, 1, 3) |
| 19 | 0    | 0 | (7, 1, 1), (12, 1, 4), (18, 1, 6) | 0 | (*, 0, 0) | 0 | (7, 1, 1), (12, 1, 2), (18, 1, 2) no changes--done! |

TABLE 2

| Block No. | Variable B Initial Value | Pass 1F Value | Pass 1F Notes | Pass 1B Value | Pass 1B Notes | Pass 2F Value | Pass 2F Notes |
|---|---|---|---|---|---|---|---|
| 1  | 0    | 0 | (*, 0, 0)              | 0 | (2, 1, 2), (13, 1, 2)   | 0 | (*, 0, 0) |
| 2  | 9999 | 1 | (1, 1, 1)              | 1 | (3, 1, 2), (8, 1, 3)    | 1 | (1, 1, 1) |
| 3  | 9999 | 2 | (2, 1, 2)              | 1 | (4, 1, 1)               | 1 | (2, 1, 2) |
| 4  | 0    | 0 | (3, 1, 3)              | 0 | (5, 1, 2)               | 0 | (3, 1, 2) |
| 5  | 9999 | 1 | (4, 1, 1)              | 1 | (6, 1, 1)               | 1 | (4, 1, 1) |
| 6  | 0    | 0 | (5, 1, 2)              | 0 | (7, 1, 2)               | 0 | (5, 1, 2) |
| 7  | 9999 | 1 | (6, 1, 1)              | 1 | (19, 1, 1)              | 1 | (6, 1, 1) |
| 8  | 9999 | 2 | (2, 1, 2)              | 2 | (9, 4, *), (12, 1, 2)   | 2 | (2, 1, 2) |
| 9  | 9999 | 0 | (8, 2, 0)              | 0 | (10, 4, *), (11, 1, 1)  | 0 | (8, 2, 0) |
| 10 | 9999 | 0 | (9, 2, 0)              | 0 | (11, 2, 0)              | 0 | (9, 2, 0) |
| 11 | 9999 | 1 | (10, 4, *), (9, 1, 1)  | 0 | (12, 2, 0)              | 0 | (10, 4, *), (9, 1, 1) |
| 12 | 9999 | 3 | (11, 4, *), (8, 1, 3)  | 1 | (19, 1, 1)              | 1 | (11, 4, *), (8, 1, 3) |
| 13 | 9999 | 1 | (1, 1, 1)              | 1 | (14, 1, 1)              | 1 | (1, 1, 1) |
| 14 | 9999 | 2 | (13, 1, 2)             | 0 | (15, 3, 0)              | 0 | (13, 1, 2) |
| 15 | 0    | 0 | (14, 2, 0)             | 0 | (16, 2, 0)              | 0 | (14, 2, 0) |
| 16 | 9999 | 0 | (15, 3, 0)             | 0 | (17, 1, 2)              | 0 | (15, 3, 0) |
| 17 | 9999 | 1 | (16, 1, 1)             | 1 | (18, 1, 2)              | 1 | (16, 1, 1) |
| 18 | 9999 | 2 | (17, 1, 2)             | 1 | (19, 1, 1)              | 1 | (17, 1, 2) |
| 19 | 0    | 0 | (7, 1, 2), (12, 1, 4), (18, 1, 3) | 0 | (*, 0, 0) | 0 | (7, 1, 2), (12, 1, 2), (18, 1, 2) no changes--done! |

TABLE 3

| Block No. | Variable C Initial Value | Pass 1F Value | Pass 1F Notes | Pass 1B Value | Pass 1B Notes | Pass 2F Value | Pass 2F Notes |
|---|---|---|---|---|---|---|---|
| 1 | 9999 | 0 | (*, 0, 0) | 0 | (2, 1, 1), (13, 1, 1) | 0 | (*, 0, 0) |
| 2 | 0 | 0 | (1, 1, 1) | 0 | (3, 1, 2), (8, 1, 1) | 0 | (1, 1, 1) |
| 3 | 9999 | 1 | (2, 1, 1) | 1 | (4, 1, 2) | 1 | (2, 1, 1) |
| 4 | 9999 | 2 | (3, 1, 2) | 1 | (5, 1, 1) | 1 | (3, 1, 2) |
| 5 | 0 | 0 | (4, 1, 3) | 0 | (6, 1, 1) | 0 | (4, 1, 2) |
| 6 | 0 | 0 | (5, 1, 1) | 0 | (7, 1, 2) | 0 | (5, 1, 1) |
| 7 | 9999 | 1 | (6, 1, 1) | 1 | (19, 1, 1) | 1 | (6, 1, 1) |
| 8 | 9999 | 1 | (2, 1, 1) | 0 | (9, 3, 0) | 0 | (2, 1, 1) |
| 9 | 9999 | 0 | (8, 2, 0) | 0 | (10, 3, 0) | 0 | (8, 2, 0) |
| 10 | 0 | 0 | (9, 2, 0) | 0 | (11, 2, 0) | 0 | (9, 2, 0) |
| 11 | 9999 | 0 | (10, 3, 0) | 0 | (12, 2, 0) | 0 | (10, 3, 0) |
| 12 | 9999 | 0 | (11, 3, 0) | 0 | (19, 1, 1) | 0 | (11, 3, 0) |
| 13 | 0 | 0 | (1, 1, 1) | 0 | (14, 1, 2) | 0 | (1, 1, 1) |
| 14 | 9999 | 1 | (13, 1, 1) | 1 | (15, 4, *), (16, 1, 3) | 1 | (13, 1, 1) |
| 15 | 9999 | 0 | (14, 2, 0) | 0 | (16, 2, 0) | 0 | (14, 2, 0) |
| 16 | 9999 | 2 | (15, 4, *), (14, 1, 2) | 2 | (17, 1, 3) | 2 | (15, 4, *), (14, 1, 2) |
| 17 | 9999 | 3 | (16, 1, 3) | 2 | (18, 1, 2) | 2 | (16, 1, 3) |
| 18 | 9999 | 4 | (17, 1, 4) | 1 | (19, 1, 1) | 1 | (17, 1, 3) |
| 19 | 0 | 0 | (7, 1, 2), (12, 1, 3), (18, 1, 5) | 0 | (*, 0, 0) | 0 | (7, 1, 2), (12, 1, 1), (18, 1, 2) no changes--done! |

As shown from Tables 1-3 and FIG. 3B, the block having the maximal distance between references is block 16, in which variable A has a distance of 3. The next most distant variable in block 16 is variable C with a distance of 2. Thus A and C may be paired as variable pairs, in this embodiment.

In selecting variables, the second and first variable may be the same size, in certain embodiments. Ideally, round functions and combining operators (and their inverses) may be present for each size. For example, different functions and operators may be present for 32-bit integers and 64-bit real numbers.

To create an encryption code, an appropriate size round function and combining operator and its inverse may be chosen. For example, squaring for the round function, addition for the combining operation, and subtraction for the inverse may be chosen. In such an example, the encryption statement for variables A and B may be of the form:

$$A = A + B*B \qquad [1]$$

and the corresponding decryption round statement may be:

$$A = A - B*B. \qquad [2]$$

Some operators, such as an exclusive-or (XOR), are their own inverse. For each pairing, only one encryption and one decryption statement may be used, regardless of how many places they are added to the code.

Figure 3C:
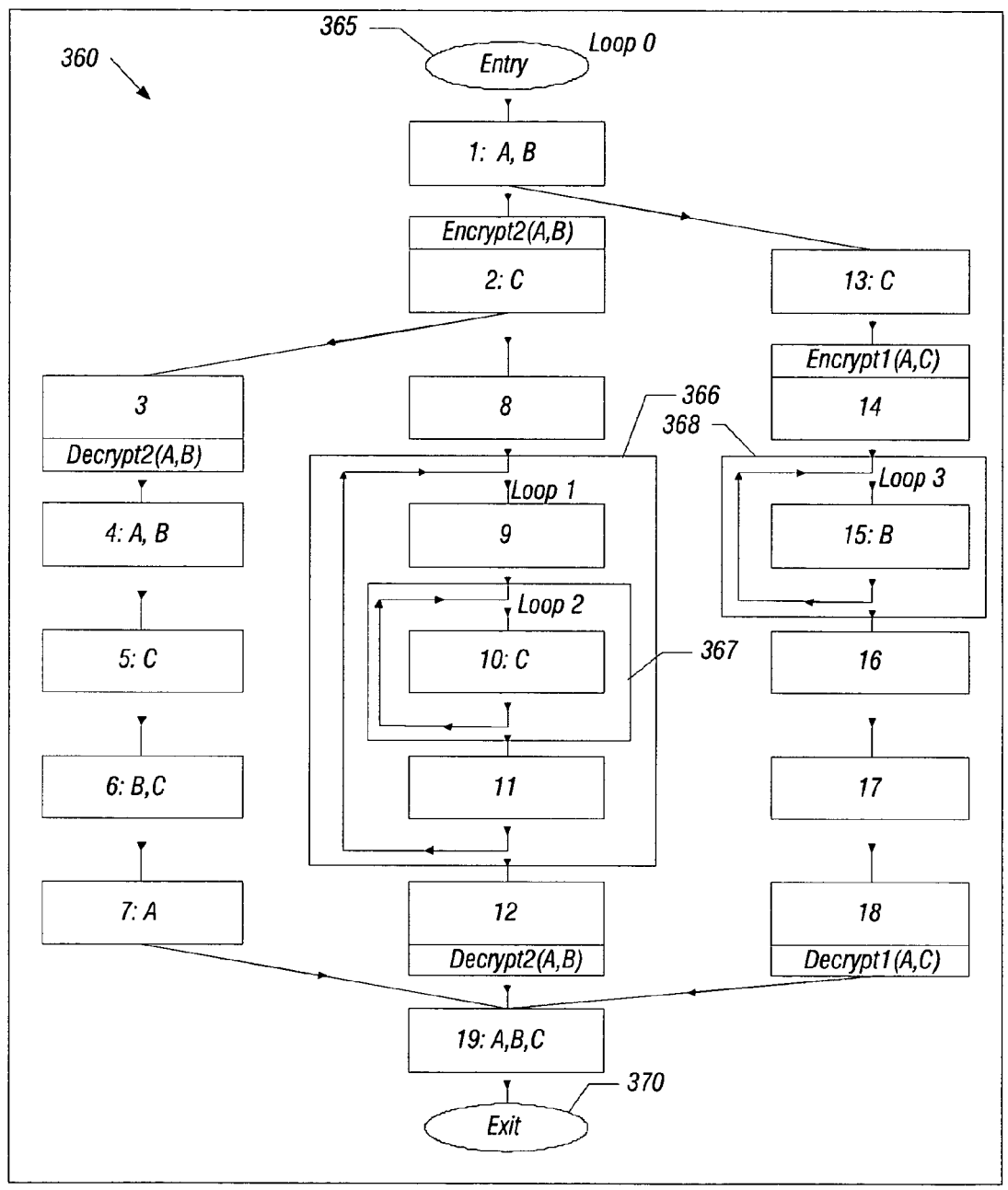
FIG. 3C is a modified control flow graph of the control flow graph of FIG. 3B showing insertion of encryption and decryption code in accordance with one embodiment of the present invention.

Referring back to Table 3 and FIG. 3B, traversing the flow graph backwards from block 16, skipping nested loops, the C value goes to zero in block 13. Thus, according to one embodiment, an encryption round may be inserted at the beginning of block 14, as shown in FIG. 3C, which is a modified control flow graph of program 360 showing the insertion of encryption and decryption rounds in accordance with the above example embodiment. The round function and a combining operation may be chosen. It does not matter which variable is the target and which is the source for the encryption round.

Traversing the flow graph forward from block 16, skipping nested loops, A and C both go to zero in block 19. Thus a corresponding decryption round at the end of block 18 may be inserted in accordance with one embodiment of the present invention, for example, using the same round function and choice of target and source variables as in the encryption round, as shown in FIG. 3C. The combining operation is the inverse of the combining operation used for encryption.

Thus blocks 14, 16, 17, and 18 have been visited. Blocks 14 and 18 now contain references to A and C due to the encryption and decryption codes inserted.

In one embodiment, a random threshold may be selected to reduce the distances more than would otherwise be done as a result of the encryption operation. If the random value is 2, all blocks with a value below 2 may be reduced to 0. In addition, the distance function may be updated to reflect the encryption and decryption code by traversing the flow graph in both directions from changed notes, but any path may be stopped as soon as the entries for a block have not changed to make the updating incremental in nature. Thus blocks 14, 16, 17, and 18 may be changed to 0, 1, 0, and 0 for variable A, respectively. For variable C, the values for those blocks would all be zero. When the distances are updated by a random number, the number is at least 1, and, typically, goes up to the maximum distance divided by 2. This number is subtracted from each block visited.

Now the maximal block is block 8, with both variables A and B at 2. Thus the process is repeated for variables A and B.

Traversing backward from block 8, A and B both go to zero at block 1. Thus, an encryption round may be inserted at the beginning of block 2. When traversing forward, the path through block 3 and the path block 8 should be considered.

Traversing forward via block 3, A and B both go to zero at block 4. Thus a decryption round may be inserted at the end of block 3. Traversing forward from block 8, A and B both go to zero at block 19. Thus the same decryption round may be inserted at the end of block 12. The distances may be updated as before. Because there are no distances over 1, the transformation is complete.

Thus, as shown in FIG. 3C, encryption rounds have been inserted in the beginning of blocks 2 and 14, and decryption rounds inserted at the end of blocks 3, 12, and 18.

Tables 4, 5 and 6 following, show the initial distances and final distances calculated in accordance with an embodiment of the present invention. As shown in Table 4, after initial distances have been calculated, a maximum value of 3 is present for variable A at block 16. The next highest variable in block 16 is 2 for variable C. Then, A and C encryption code may be inserted, and an update of the distances may be calculated. After selecting a random threshold of 2 with which to update the distances, Table 5 shows a new maximum of 2 for variables A and B in block 8. Then, A and B encryption code is inserted, and a second update of the distances may be calculated. Because the new maximum value is 1 and is below the final threshold, data transformation is complete, as shown in Table 6.

TABLE 4

| Block | A | B | C | Notes |
|---|---|---|---|---|
| 1 | 0 | 0 | 0 | |
| 2 | 1 | 1 | 0 | |
| 3 | 1 | 1 | 1 | |
| 4 | 0 | 0 | 1 | |
| 5 | 1 | 1 | 0 | |
| 6 | 1 | 0 | 0 | |
| 7 | 0 | 1 | 1 | |
| 8 | 2 | 2 | 0 | |
| 9 | 0 | 0 | 0 | |
| 10 | 0 | 0 | 0 | |
| 11 | 0 | 0 | 0 | |
| 12 | 1 | 1 | 0 | |
| 13 | 1 | 1 | 0 | |
| 14 | 2 | 0 | 1 | |
| 15 | 0 | 0 | 0 | |
| 16 | 3 | 0 | 2 | <====maximum value at block 16, variable A. Next highest variable is C. |
| 17 | 2 | 1 | 2 | |
| 18 | 1 | 1 | 1 | |
| 19 | 0 | 0 | 0 | |

TABLE 5

| Block | A | B | C | Notes |
|---|---|---|---|---|
| 1 | 0 | 0 | 0 | |
| 2 | 1 | 1 | 0 | |
| 3 | 1 | 1 | 1 | |
| 4 | 0 | 0 | 1 | |
| 5 | 1 | 1 | 0 | |
| 6 | 1 | 0 | 0 | |
| 7 | 0 | 1 | 1 | |
| 8 | 2 | 2 | 0 | <===new maximum block 8 variable A or B, second variable B or A |
| 9 | 0 | 0 | 0 | |
| 10 | 0 | 0 | 0 | |
| 11 | 0 | 0 | 0 | |
| 12 | 1 | 1 | 0 | |
| 13 | 1 | 1 | 0 | |
| 14 | 0 | 0 | 0 | |
| 15 | 0 | 0 | 0 | |
| 16 | 1 | 0 | 0 | |
| 17 | 0 | 1 | 0 | |
| 18 | 0 | 1 | 0 | |
| 19 | 0 | 0 | 0 | |

TABLE 6

| Block | A | B | C |
|---|---|---|---|
| 1 | 0 | 0 | 0 |
| 2 | 0 | 0 | 0 |
| 3 | 0 | 0 | 1 |
| 4 | 0 | 0 | 1 |
| 5 | 1 | 1 | 0 |
| 6 | 1 | 0 | 0 |
| 7 | 0 | 1 | 1 |
| 8 | 0 | 0 | 0 |
| 9 | 0 | 0 | 0 |
| 10 | 0 | 0 | 0 |
| 11 | 0 | 0 | 0 |
| 12 | 0 | 0 | 0 |
| 13 | 0 | 1 | 0 |
| 14 | 0 | 0 | 0 |
| 15 | 0 | 0 | 0 |
| 16 | 1 | 0 | 0 |
| 17 | 0 | 1 | 0 |
| 18 | 0 | 1 | 0 |
| 19 | 0 | 0 | 0 | new maximum value is 1 -- below final threshold

Thus to effect data flow transformation, in a control flow graph indicating data and code paths across a set of source code blocks, reference points (i.e., where a stored data value was used and where the loaded data value was defined) for each data variable may be determined, in some embodiments of the present invention. Distances in terms of scheduled code for each loop may be computed, considering loop entries and exits to be the reference points, while taking nested loops into account.

In one embodiment, one of the heuristics 100 (FIG. 1) may select a block and a pair of data objects of the same type from the set of source code blocks that contains a first variable having a maximum distance (D1) over the set of blocks and a second variable having a next maximal distance (D2) within the same block. Moving up and down along the control flow graph towards the next reachable use of either variable, upstream encryption points and downstream decryption points may be identified along each path of the control flow graph.

Specifically, an upstream reference point corresponding to a first variable may be identified. Likewise, an upstream reference point for a second variable may be identified. For the first variable, a downstream reference point may be located in the block in addition to the downstream reference point for the second variable therein.

Within the first block, data in between a pair of references to the first and second data variables may be encrypted using a customized cipher formed based on an appropriate encryption code. In particular, an encryption code may be inserted for one or more rounds of encryption or decryption at each upstream and downstream reference point, consistent with some embodiments of the present invention. This encryption code may be based on a customized cipher which may be formed according to the existing program operation or operator PROG_OP (1) code being associated at a first reference point for the first variable.

A second reference point in the original source code 35 may be identified for the first variable downstream in a similar fashion. Thereafter, at the downstream reference point a decryption code corresponding to the encryption code may be inserted. In many embodiments of the present invention, the distance (D1) and distance (D2) may be decreased to reflect the encryption/decryption operations, repeating the process until no further pairings of data variables relative to a threshold distance may be possible in some situations consistent with the heuristics 100. The threshold distance may indicate the code distance in terms of scheduled code from which no further pairings of matching variables may be derived, in accordance with certain embodiments of the present invention.

Figure 4:
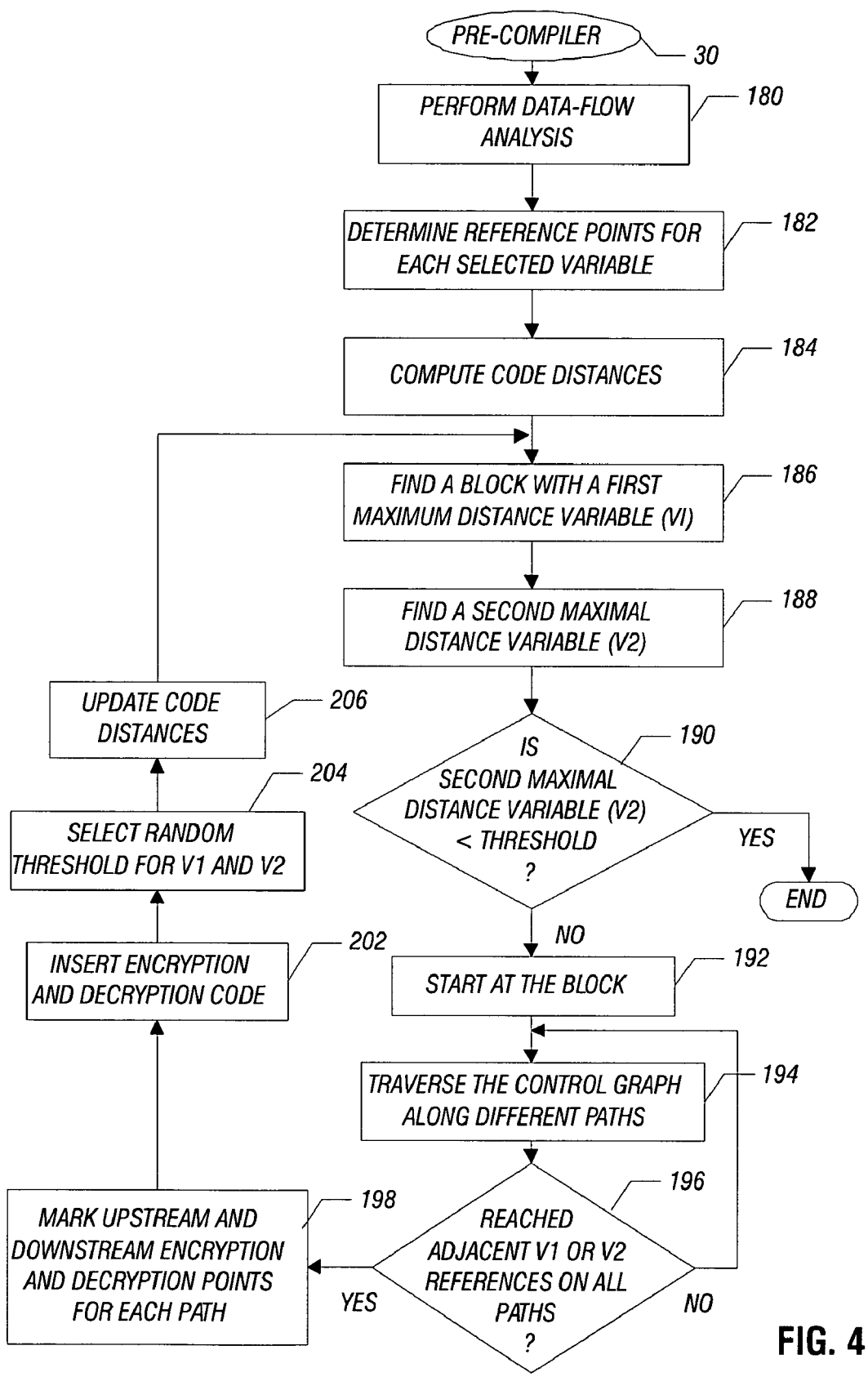
FIG. 4 is a flow diagram showing a pre-compiling method in accordance with one embodiment of the present invention.

Referring now to FIG. 4, shown is a flow diagram of a method in accordance with one embodiment of the present invention. According to this embodiment, the pre-compiler software 30 may perform a data flow analysis using the code transformer 70 and the analyzer 75 at block 180, as shown in FIG. 4. For example, for the original source code 35, reference points for each selected variable in the data flow analysis may be determined at block 182. In terms of the scheduled code, the code distances may be computed for each loop at block 184 while considering both loop entries and exits as references to the variables and accounting for nested loops. Using the heuristics 100, the pre-compiler software 30 may find a block with a first maximum code distance corresponding to a first variable (V1) at block 186. A second maximal code distance variable (V2) may be determined in a similar fashion at block 188, consistent with some embodiments of the present invention.

A check as to the code distance for the second variable (V2) relative to a threshold code distance, at diamond 190, may indicate whether or not the second maximal code distance variable (V2) is less than the threshold code distance. Because the code distances are decreased to reflect the encryption/decryption operations, when the pre-compiler software 30 reaches the threshold code distance, a block containing the first variable (V1) with the maximal code distance over all blocks of the set of blocks, and the second variable (V2) having the next maximal code distance in the same block may be selected for adding encryption and decryption code.

In case the second maximal code distance variable (V2) is determined to be less than the threshold code distance, the data flow analysis ends, according to one embodiment of the present invention. Conversely, if the next second maximal code distance variable (V2) is indicated to be greater than the threshold code distance, starting at block 192, the control flow graph along different paths may be traversed at block 194. However, in a specific embodiment, all paths in alternating directions, i.e., upstream and downstream, may be traversed until just before reaching each next use of the first variable (V1) or the second variable (V2).

A check at diamond 196 may determine whether or not the use of adjacent first and second variables (V1) and (V2) is reached on all paths. When it is determined that the usage of either of the first variable (V1) or the second variable (V2) is not reached, i.e., a reference is not made to either one of them, then the flow returns to block 194. However, if the next reference to the first variable (V1) or to the second variable (V2) is indeed on all paths reached at the diamond 196, upstream and downstream encryption and decryption reference points may be marked for each path at block 198.

Then, encryption and decryption code may be inserted at corresponding upstream and downstream reference points at block 202. For example, interlocking Feistal networks may be incorporated into the code. At block 204, another threshold code distance for the first variable (V1) and second variable (V2) may be randomly selected. Code distances may be updated at block 206, setting the distances under the random threshold for each variable to zero, in certain embodiments of the present invention. Finally, the flow may return to block 186 in some embodiments of the present invention for further processing.

Accordingly, use of encrypting compiler-generated code and existing program operations or operators 40 in the original source code 35 for encryption may be effected. In such manner, the compiler analysis by the analyzer 75 while using the heuristics 100 for pairing variables and identifying encryption/decryption and/or upstream/downstream reference points, may provide desirable content protection in some embodiments of the present invention. Examples of a few applications for content protection include copy protection for software, conditional access to devices (e.g., set-top boxes for satellite television and video on-demand) and applications that may involve distribution control for protected content playback. Some examples of content protection may involve software-based cryptographic content protection for Internet media distribution, including electronic books, music, and video.

Consistent with some embodiments of the present invention, analyzer 75 may detect usage of one or more redundant computations in interlocking Feistal networks. A provision for corruption of unrelated data values relative to the data values associated with the variables of the variable pair may additionally be provided in response to a change in the redundant computations in the analyzer 75, according to other embodiments of the present invention.

Additional heuristics may be used in the heuristics 100 to limit the amount of the encrypting compiler-generated code depending upon the desirable performance level expected from the pre-compiler software 30, in some particular scenarios. Based on another heuristic, in the variable pairing process, compilation-unique differences, i.e., differences across from one compilation to another compilation may be introduced. In addition, diffusion may be added via yet another heuristic, assisting in propagation of undesired data tampering. The diffusion may entail, in one embodiment, improving the chance that a new variable may be selected for different variable reference partners across compilations rather than selection of the same pair over again.

In this manner, sensitive software-based content exchanges on physically insecure system components and between user devices and vendors may be advantageously provided in a variety of hostile environments. While improving robustness rules in content protection, attacks to reverse engineer the original source code 35 based on automated programs or tools involving data flow, control flow or flow analysis may be thwarted in some scenarios. Combination of content protection with the use of the cryptographic customized ciphers which may be used only once to encrypt the data when not in use, skipping of even smaller sections of program object or compiled code without massive data corruption being caused by the inclusion or mixing of the encrypting compiler-generated code may not be possible, in accordance with other embodiments of the present invention.

Figure 5A:
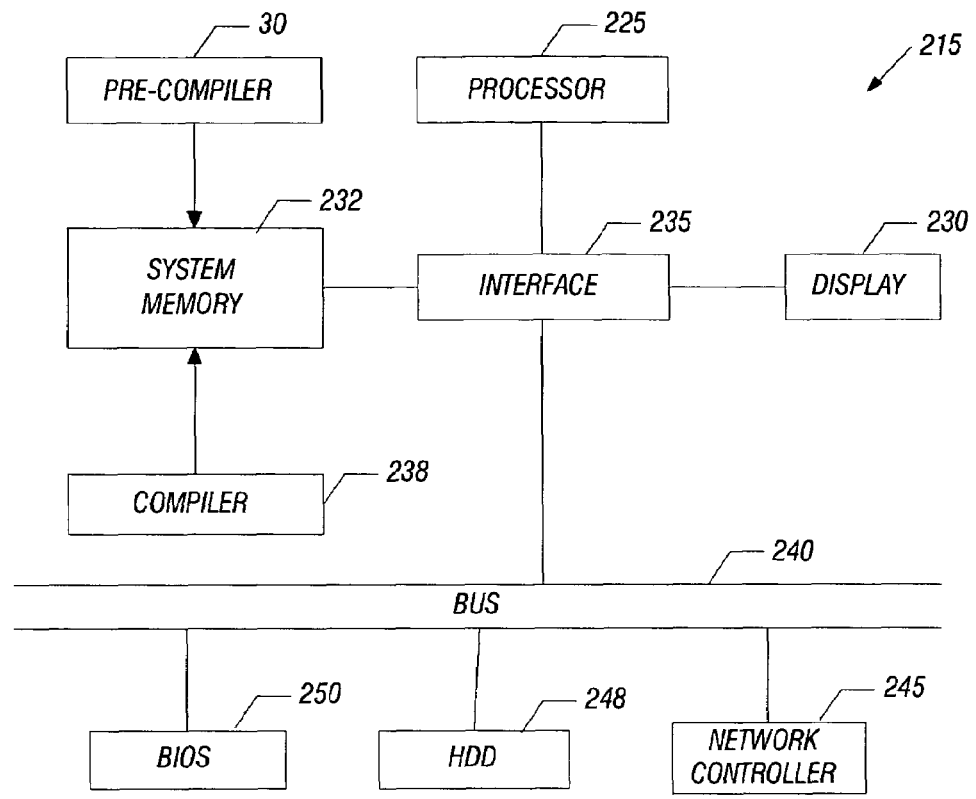
FIG. 5A is a block diagram of a processor-based system for use with one embodiment of the present invention.

Some embodiments of the present invention may be implemented in software for execution by a processor-based system 215, as shown in FIG. 5A. For example, embodiments may be implemented in code and may be stored on a storage medium having stored thereon instructions which can be used to program a system, such as a wireless device to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EE- PROMs), magnetic or optical cards, or any type of media suitable for storing electronic instructions, including programmable storage devices.

In many embodiments of the present invention, the processor-based system 215 may include a processor 225 coupled to a display 230 and a system memory 232 through an interface 235. Illustrative interface 235 may be a bridge circuit in one embodiment, or may include one or more buses in another embodiment. The pre-compiler software 30 and a compiler 238, such as a commercial compiler, may be loaded into the system memory 232 according to operations consistent with certain embodiments of the present invention.

In the processor-based system 215, a primary bus 240 conforming to the peripheral component interface (PCI) standard, for example, may couple a network controller 245, a hard disk drive (HDD) 248 and a basic input/output system (BIOS) to the processor 225 through the interface 235. In this manner, the primary bus 240 may couple to the interface 235 while providing an interface to peripheral devices. For some embodiments of the present invention, the processor-based system 215 may be responsible for distributing the compiler-modified code 60. Other systems may be implemented in other embodiments of the present invention.

Figure 5B:
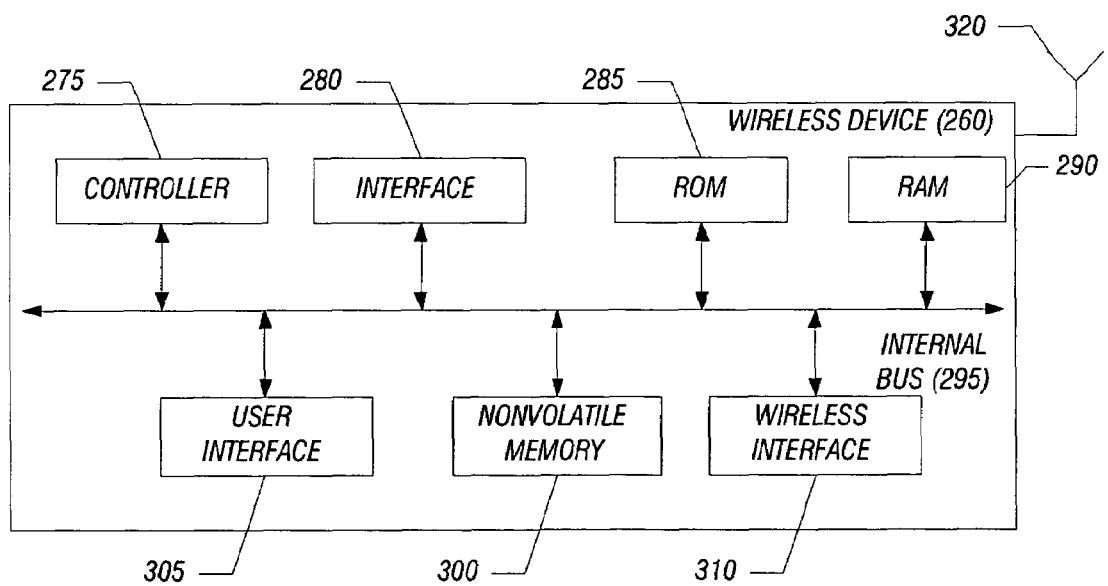
FIG. 5B is a block diagram of a wireless device for use with one embodiment of the present invention.

In different embodiments, however, wireless devices may be used. A wireless device 260 in accordance with one embodiment of the present invention, as shown in FIG. 5B may include a semiconductor nonvolatile memory 300, a user interface 305, a wireless interface 310, and an antenna 320. In various embodiments, antenna 320 may be a dipole, helical, global system for mobile (GSM) communication antenna, or the like. Components of the wireless device 260, which may be a processor-based device may further include a controller 275, an interface 280, a read only memory (ROM) 285, and a random access memory (RAM) 290 coupled via an internal bus 295, according to one embodiment of the present invention. The interface 280 may enable communication via the wireless interface 310 and the antenna 320 to a platform that may distribute content, e.g., the compiler-modified code 60.

Examples of the wireless device 260 may include mobile devices and/or cellular handsets that may be targeted for providing various subscriber services by commercial vendors or service providers. To manipulate such services or simply to activate or reconfigure a device, content, e.g., the compiler-modified code 60, may be received via an over the air interface at the wireless device 260 in one embodiment.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   dynamically obtaining one or more program operators from source code in a pre-compiler of a compiler module; and
   applying data transformation to a portion of the source code in the pre-compiler to create interlocking Feistal networks in each iteration of a plurality of iterations of forming matching pairs of data values, based on one of said one or more program operators to provide encrypting compiler-generated code.

2. The method of claim 1, including mixing the encrypting compiler-generated code with the source code other than said portion before compilation.

3. The method of claim 1, further comprising dynamically deriving from the source code at least one compiler-generated operator for said data transformation.

4. The method of claim 3, further comprising performing encryption using at least one of said at least one compiler-generated operator and said at least one of said one or more program operators.

5. The method of claim 1, further comprising selectively encrypting one or more regions of the source code with a custom cipher formed from said at least one of said one or more program operators.

6. The method of claim 1, including:
   determining at least two references for each variable of a variable pair to selectively encrypt and decrypt data in between said at least two references; and
   associating at least two of the data values with each variable of the variable pair for encryption of the data in a first transformation and decryption of the data in a second transformation.

7. The method of claim 6, further comprising:
   iteratively forming the matching pairs of said data values for each variable of the variable pair; and
   creating the interlocking Feistal networks in each iteration involving a different matching pair of said data values.

8. The method of claim 7, further comprising:
   enabling detection of usage of one or more redundant computations in the interlocking Feistal networks; and
   in response to a change in at least one of the one or more redundant computations, provisioning for corruption of unrelated data values relative to said data values.

9. A method comprising:
   analyzing flow of data in source code having one or more program operators to determine matching references to a pair of variables;
   determining a block of the source code in which said pair of variables is not used;
   associating the matching references based on a heuristic to provide data encryption to modify a portion of the source code into encrypting compiler-generated code, including utilizing the heuristic to enhance obfuscation of the encrypting compiler-generated code within the source code using at least one of said one or more program operators; and
   mixing the encrypting compiler-generated code with the source code.

10. The method of claim 9, wherein analyzing flow of data further including:
    detecting a first region of the source code in which use of a stored value for at least one variable of said pair of variables occurs; and
    detecting a second region of the source code in which the stored value is defined for the at least one variable of said pair of variables.

11. A method comprising:
    identifying a first reference point and a second reference point within a set of blocks of source code having one or more program operators;
    associating an encryption code in proximity to the first reference point and associating a decryption code in proximity to the second reference point;
    customizing a cipher based on at least one of said one or more program operators;
    selecting a block from the set of blocks, the block containing a first variable having a maximum distance over the set of blocks, and a second variable having a next maximal distance in the same block;

providing the encryption code to encrypt data in between a pair of references to the first and second variables;

providing the decryption code to decrypt said data; and compiling a portion of the source code into encrypting compiler-generated code to mix with the source code other than said portion.

12. The method of claim 11, further comprising recompiling the encrypting compiler-generated code with the source code other than said portion into tamper resistant object code.

13. The method of claim 11, including:

deriving from the source code at least one compiler-generated operator for data flow transformation; and using at least one of said at least one compiler-generated operator and said at least one of said one or more program operators to provide the encryption code.

14. An article comprising a medium storing instructions that, if executed enable a system to:

dynamically obtain one or more program operators from source code; and apply data transformation to a portion of the source code to create a Feistal network in each iteration of a plurality of iterations of forming matching pairs of data values, based on one of said one or more program operators to form encrypting compiler-generated code.

15. The article of claim 14, further comprising instructions that if executed enable the system to mix the encrypting compiler-generated code with the source code other than said portion.

16. The article of claim 14, further comprising instructions that, if executed enable the system to use at least one compiler-generated operator and said at least one of said one or more program operators for encryption.

17. The article of claim 14, further comprising instructions that, if executed enable the system to selectively encrypt one or more regions of the source code with a cipher formed from said at least one of said one or more program operators.

18. An apparatus comprising:

an analyzer to perform data flaw analysis of source code to dynamically obtain one or more program operators therefrom;

a code transformer coupled to said analyzer to apply data transformation to select a selected region of the source code in which to provide encrypting compiler-generated code based on one of said one or more program operators;

an encryption engine to selectively encrypt and decrypt the selected region based on references to a variable identified in the selected region; and a heuristic to select the selected region and the references.

19. The apparatus of claim 18, further comprising a cipher based on said at least one of one or more program operators.

20. A system comprising:

a dynamic random access memory having source code stored therein;

an analyzer to perform data flow analysis of the source code to dynamically obtain one or more program operators therefrom;

a code transformer coupled to said analyzer to apply data transformation to select a selected region of the source code to provide encrypting compiler-generated code based on one of said one or more program operators; an encryption engine to selectively encrypt and decrypt the selected region based on references to a variable identified in the selected region; and a heuristic to select the selected region and the references.

21. The system of claim 20, further comprising a cipher based on said at least one of one or more program operators.

22. The apparatus of claim 18, wherein the analyzer includes a flow analysis engine to identify the selected region in which the variable is not used.

23. The system of claim 20, wherein the analyzer includes a flow analysis engine to identify the selected region in which the variable is not used.

* * * * *

UNITED STATES PATENT AND TRADEMARK OFFICE
CERTIFICATE OF CORRECTION

PATENT NO. : 7,366,914 B2 Page 1 of 1
APPLICATION NO. : 10/652140
DATED : April 9, 2008
INVENTOR(S) : Gary L. Graunke It is certified that error appears in the above-identified patent and that said Letters Patent is hereby corrected as shown below:

Column 18:
Line 2 claim 18, "flaw" should be --flow--.

Signed and Sealed this

Nineteenth Day of August, 2008

JON W. DUDAS
*Director of the United States Patent and Trademark Office*

UNITED STATES PATENT AND TRADEMARK OFFICE
CERTIFICATE OF CORRECTION

PATENT NO. : 7,366,914 B2 Page 1 of 1
APPLICATION NO. : 10/652140
DATED : April 29, 2008
INVENTOR(S) : Gary L. Graunke It is certified that error appears in the above-identified patent and that said Letters Patent is hereby corrected as shown below:

Column 18:
Line 2 claim 18, "flaw" should be --flow--.

This certificate supersedes the Certificate of Correction issued August 19, 2008.

Signed and Sealed this

Sixteenth Day of September, 2008

JON W. DUDAS
*Director of the United States Patent and Trademark Office*